United States Patent [19]

Hirai

[11] Patent Number: 4,550,982
[45] Date of Patent: Nov. 5, 1985

[54] ALL-SOLID-STATE DISPLAY INCLUDING AN ORGANIC ELECTROCHROMIC LAYER WITH ION DONOR/ACCEPTOR

[75] Inventor: Yoshihiko Hirai, Tokyo, Japan

[73] Assignee: Nippon Electric Co., Ltd., Tokyo, Japan

[21] Appl. No.: 440,465

[22] Filed: Nov. 9, 1982

[30] Foreign Application Priority Data

| Nov. 9, 1981 | [JP] | Japan | 56-179311 |
| Mar. 24, 1982 | [JP] | Japan | 57-46907 |
| May 24, 1982 | [JP] | Japan | 57-87488 |
| May 27, 1982 | [JP] | Japan | 57-90109 |
| May 27, 1982 | [JP] | Japan | 57-90110 |
| May 27, 1982 | [JP] | Japan | 57-90111 |

[51] Int. Cl.$^4$ ............................................. G02F 1/17
[52] U.S. Cl. ............................................. 350/357
[58] Field of Search ................... 350/357; 252/408.1

[56] References Cited

U.S. PATENT DOCUMENTS

| 4,116,545 | 9/1978 | Reddy | 350/357 |
| 4,142,783 | 3/1979 | Engler et al. | 350/357 |
| 4,298,250 | 11/1981 | Boyd et al. | 350/357 |
| 4,304,465 | 12/1981 | Diaz | 350/357 |
| 4,306,774 | 12/1981 | Nicholson | 350/357 |

OTHER PUBLICATIONS

Watanabe et al., "High Lithium Ionic Conductivity of Polymeric Solid Electrolytes", Makromol. Chem., Rapid Common, 2, 1981, pp. 741-744.
Engler et al., "Electrochromic Display Device with Memory Based on Homogeneous Doner Polymer Films", IBM Tech. Disc. Bull., 12-1979, pp. 2993-2997.
Itava et al., "Polymer-Modified Electrodes", J. Electrochem. Soc. (USA) vol. 129, #4, 4-1982, pp. 762-767.
Farrington et al., "Fast Ionic Transport in Solids", Science 6-29-79, pp. 1371-1379.

Primary Examiner—William H. Punter
Attorney, Agent, or Firm—Sughrue, Mion, Zinn, Macpeak, and Seas

[57] ABSTRACT

Between a display electrode and a counter electrode, an all-solid-state organic electrochromic display device comprises a polymer layer comprising at least one organic electrochromic material and at lest one ionic material. The layer may be a polymer film of at least one polymer material in which film the electrochromic and the ionic materials are dispersed, a polymer electrochromic film comprising the electrochromic material in which film the ionic material is dispersed, a polymer ionic film comprising the ionic material in which film the electrochromic material is dispersed, or a polymer electrochromic and ionic film comprising the electrochromic and the ionic materials. Between the electrochromic layer and the counter electrode, the device may comprise a polymer redox layer which is similar in structure to the electrochromic layer and preferably comprises at least one ionic material. Between the electrochromic layer and either one of the display and the counter electrodes or the redox layer, the device may comprise a solid electrolyte layer which may either be a polymer ionic layer or an inorganic solid electrolyte layer. Preferably, the electrochromic, the redox, and/or the polymer ionic layer include conductive powder, at least one plasticizer, and/or reflective powder and, more preferably, are cross-linked. A conductive and/or reflective powder may be included in the inorganic solid electrolyte layer.

76 Claims, 8 Drawing Figures

ALL-SOLID-STATE DISPLAY INCLUDING AN ORGANIC ELECTROCHROMIC LAYER WITH ION DONOR/ACCEPTOR

BACKGROUND OF THE INVENTION

This invention relates to an all-solid-state electrochromic display device and an organic electrochromic display device. A display device is often referred to either as a display panel or merely as a display.

As will later be described in detail with reference to two of eight figures of the accompanying drawings, a typical electrochromic display device comprises a base electrode, an electrolyte layer or film on the base electrode, an electrochromic layer or film on the electrolyte layer, and a display electrode on the electrochromic layer. The base electrode will herein be referred to, in relation to the display electrode, as a counter electrode. The display electrode is substantially transparent. The counter electrode may or may not be transparent. The display electrode may consist of a plurality of segmented electrodes arranged in a predetermined geometrical configuration. Alternatively, the display and the counter electrodes may provide a matrix of electrodes. The electrochromic layer is a layer or film of an electrochromic material, which will become clear as the description proceeds. As seen from the foregoing, an electrochromic display device comprises a substantially transparent electrode, a counter electrode, and an electrochromic layer between the transparent and the counter electrodes.

When a signal or electric voltage is applied to the display electrode as an operating voltage relative to the counter electrode, the electrochromic material is readily subjected to a redox reaction, namely, either reduced or oxidized. The redox reaction of the electrochromic material results in a reversible variation in the absorption spectrum in the visible range. The electrochromic display device therefore displays a visible display. Such an electrochromic display device is promising because the visible display is distinctly colored, scarcely dependent on the angle of viewing, and clear even when exposed to direct rays.

Various inorganic and organic electrochromic materials are already known. Examples are oxides of transition metals, such as tungsten oxide, aromatic or heterocyclic compounds, and organometallic compounds, namely, coordination compounds or complexes of transition metals and aromatic or heterocyclic compounds. It should be noted that various organometallic compounds are organic compounds in general and that the expression an "organic" electrochromic material may or may not mean an "organometallic" electrochromic material.

In contrast to the fact that the color displayed by an inorganic electrochromic material is restricted to deep blue, organic electrochromic materials are capable of displaying a number of colors when various functional groups or radicals are substituted for terminal or end groups of the aromatic or heterocyclic compounds.

The electrolyte layer has mostly been manufactured of a liquid electrolyte. An electrochromic display device of this type is defective. The device must comprise a hermetic casing for the liquid. The structure is therefore intricate. The liquid electrolyte must be forced into the casing. This complicates the process of manufacture. Even with the intricate structure and the complicated process, the electrolyte can leak out of the casing due, for example, to thermal expansion and can thereby damage other electronic devices.

It is known to use insulating materials, such as silicon monoxide, calcium fluoride, magnesium fluoride, and chromium sesquioxide, as solid electrolytes. In an all-solid-state electrochromic display device including an insulator solid electrolyte layer, the redox reaction takes place in the electrochromic layer as a result of the action of moisture absorbed in the insulating material. The redox reaction is therefore seriously influenced by surrounding conditions, above all, by humidity. Furthermore, the absorbed moisture gives rise to bubbles on occurrence of the redox reaction. This adversely affects the reliability of operation of the electrochromic display device.

Other known solid electrolytes are ion conductive materials as, for example, lithium nitride and beta alumina in which the lithium or sodium ions contribute to the ionic conduction. An all-solid-state electrochromic display device including a lithium or sodium ion conductive solid electrolyte layer is disadvantageous because the response is slow due to the small ion mobility. Moreover, such an electrolyte layer does not tenaciously adhere to the electrochromic layer and/or the counter electrode. Chemical reaction tends to occur at the interface. As a result, the life is short.

At any rate, such a solid electrolyte layer has been used in combination with inorganic electrochromic materials. A typical all-solid-state electrochromic display device of this type has a response speed of ten seconds for a display of a contrast of 3:1 when the display is exposed to rays of the daylight color or to a white color which are either incident onto the display electrode or onto both the display electrode and the transparent counter electrode. Such a contrast will be called a daylight contrast.

The organic electrochromic materials have been used in combination with liquid electrolytes. The electrochromic display devices of this type are described, for example, in an article contributed by C. J. Schoot et al to Applied Physics, Letters, Volume 23, No. 2 (July 15, 1973), pages 64–65, under the title of "New Electrochromic Memory Display," and in another article contributed by L. G. Van Uitert et al to Applied Physics, Letters, Volume 36, No. 1 (Jan. 1, 1980), pages 109–111, under the title of "Anthraquinone Red Display Cells." All-solid-state electrochromic display devices have not yet been known, in which an organic electrochromic layer is used. A electrochromic display device comprising an organic electrochromic layer is herein called an organic electrochromic display device.

SUMMARY OF THE INVENTION

It is therefore a general object of the present invention to provide an all-solid-state organic electrochromic display device or panel.

It is a specific object of this invention to provide an all-solid-state organic electrochromic display device which is reliable and is capable of displaying a display of one or more desired colors.

It is another specific object of this invention to provide an all-solid-state organic electrochromic display device of the type described, which is highly resistive to surrounding conditions.

It is still another specific object of this invention to provide an all-solid-state organic electrochromic display device of the type described, which has a quick response speed.

It is yet another specific object of this invention to provide an all-solid-state organic electrochromic display device of the type described, which can be manufactured at a low cost.

Other specific objects of this invention will become clear as the description proceeds.

According to this invention, there is provided an all-solid-state electrochromic display device comprising a substantially transparent electrode, a counter electrode, and an electrochromic layer between the transparent and the counter electrodes, wherein the electrochromic layer consists essentially of a polymer electrochromic film comprising at least one organic electrochromic material and at least one ionic material.

As will presently become clear, the ionic material is a material which acts as an ion donor or an ion acceptor.

DESCRIPTION OF THE PREFERRED EMBODIMENTS

It is possible to manufacture all-solid-state organic electrochromic display devices or panels according to the present invention in a number of kinds of structure. Materials for various components of the display devices will shortly be described in detail.

Figure 1:
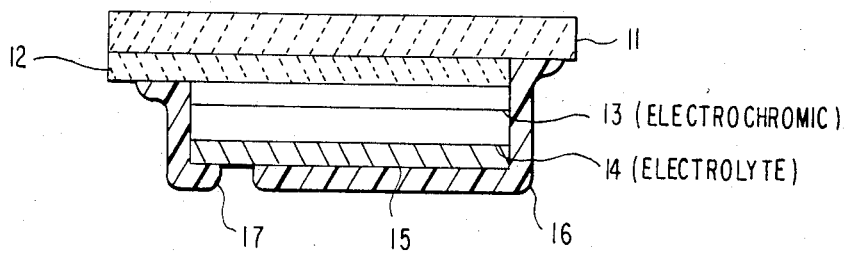
FIG. 1 is a schematic vertical sectional view of an all-solid-state organic electrochromic display device according to a first embodiment of the instant invention.

Referring to FIG. 1, an electrochromic display device according to a first embodiment of this invention comprises a transparent cover plate 11, a display electrode 12 under the cover plate 11, an organic electrochromic layer or film 13 under the display electrode 12, a solid electrolyte layer or film 14 under the electrochromic layer 13, and a counter electrode 15 under the electrolyte layer 14. The display electrode 12, the electrochromic layer 13, the electrolyte layer 14, and the counter electrode 15 are encased in a casing 16 sealed to the cover plate 11 to enclose a sealed space with a portion of the display electrode 12 led out of the sealed space and with a via or through hole 17 formed for providing an electrical contact with the counter electrode 15.

Figure 2:
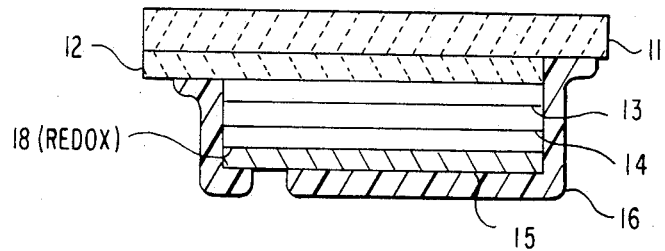
FIG. 2 is a schematic vertical sectional view of an all-solid-state organic electrochromic display device according to a second embodiment of this invention.

Referring to FIG. 2, an electrochromic display device according to a second embodiment of this invention comprises similar parts designated by like reference numerals. A redox layer or film 18 is interposed between the solid electrolyte layer 14 and the counter electrode 15.

Figure 3:
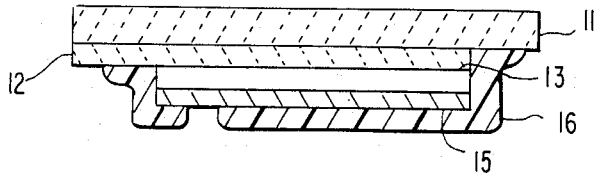
FIG. 3 is a schematic vertical sectional view of an all-solid-state organic electrochromic display device according to a third embodiment of this invention.

Referring to FIG. 3, an electrochromic display device according to a third embodiment of this invention is similar in structure to the display device illustrated with reference to FIG. 1. The display device depicted in FIG. 3, however, does not include the solid electrolyte layer 14.

Figure 4:
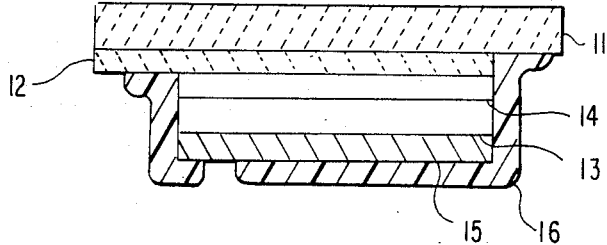
FIG. 4 is a schematic vertical sectional view of an all-solid-state organic electrochromic display device according to a fourth embodiment of this invention.

Referring to FIG. 4, an electrochromic display device according to a fourth embodiment of this invention comprises similar parts designated by like reference numerals. The order of stack of the organic electrochromic layer 13 and the solid electrolyte layer 14 is reversed as compared with the display device illustrated in FIG. 1.

Figure 5:
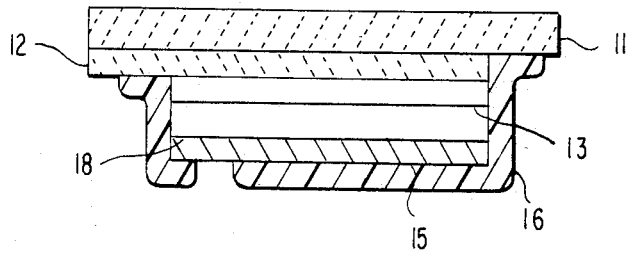
FIG. 5 is a schematic vertical sectional view of an all-solid-state organic electrochromic display device according to a fifth embodiment of this invention.

Referring to FIG. 5, an electrochromic display device according to a fifth embodiment of this invention is similar in structure to the display device illustrated with reference to FIG. 1. A redox layer 18 is substituted for the solid electrolyte layer 14.

Figure 6:
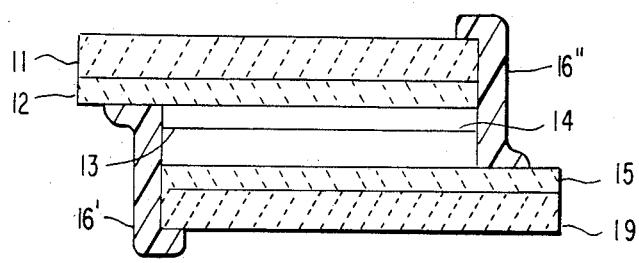
FIG. 6 is a schematic vertical sectional view of an all-solid-state organic electrochromic display device according to a modification of the display device illustrated in FIG. 1.

Referring to FIG. 6, an electrochromic display device herein shown, is a modification of the display device illustrated with reference to FIG. 1. The casing is formed of a surrounding wall and a bottom plate 19. The surrounding wall is sealed to the cover and the bottom plates 11 and 19 and will be referred to as a pair of side walls 16' and 16".

Figure 7:
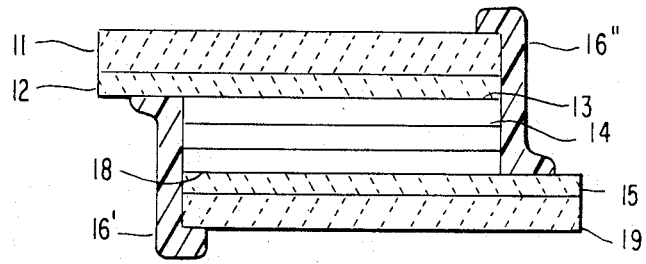
FIG. 7 is a schematic vertical sectional view of an all-solid-state organic electrochromic display device according to a modification of the display device shown in FIG. 2.

Referring to FIG. 7, an electrochromic display device being illustrated, is a modification of the display device shown in FIG. 2. Insofar as the casing is concerned, the illustrated device is similar to the display device depicted in FIG. 6.

Figure 8:
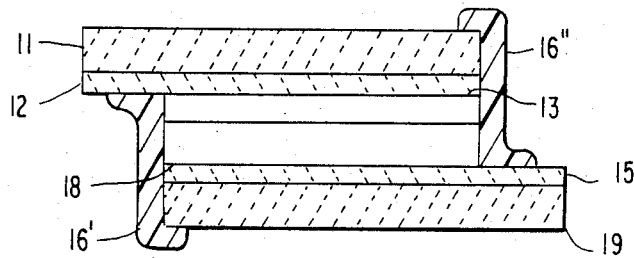
FIG. 8 is a schematic vertical sectional view of an all-solid-state organic electrochromic display device according to a modification of the display device depicted in FIG. 5.

Referring to FIG. 8, an electrochromic display device herein depicted, is a modification of the display device shown in FIG. 5. As regards the casing, the structure is similar to that depicted in FIG. 6.

Throughout FIGS. 1 through 8, it should be understood as will later become clear that the thickness of each of the electrodes and the layers is exaggerated. The display device depicted in FIG. 3 is most readily manufactured. The display devices illustrated with reference to FIGS. 1, 4, and 5 are more readily manufactured than that shown in FIG. 2. In general, the display devices depicted in FIGS. 6 through 8 are more reliable than the corresponding display devices shown in FIGS. 1, 2, and 5. In the display devices illustrated in FIGS. 6 through 8, the bottom plate 19 may or may not be transparent. In the event that the bottom plate 19 is transparent, it is possible to put the display device into operation with the device illuminated on both sides. The display devices shown in FIGS. 1 and 6 are of the type which is typical in a conventional electrochromic display device.

The transparent cover plate 11 is made of glass or a transparent plastic material. The display electrode 12 is formed of a tin oxide film or an ITO (a mixture of indium oxide and tin oxide) film. The display electrode 12 is usually fabricated on the cover plate 11 by vacuum evaporation. It is possible to fabricate the display electrode 12 by the spraying method, the CVD technique, or precipitation.

The counter electrode 15 is made of gold, silver, copper, carbon, or any other conductive material including the material of the display electrode 12. The casing 16 (16' and 16") is preferably made of an adhesive organic material, such as epoxy resin, a low melting point glass material, any one of the materials used in molding IC's, or any other material capable of providing a seal. The bottom plate 19 may be made of glass, metal, or a plastic material. It is convenient to fabricate the bottom plate 19 with the material for the casing 16.

The organic electrochromic layer 13 consists essentially of a polymer film or layer comprising at least one organic electrochromic material and at least one ionic material. On fabricating the polymer film, it is convenient to use at least one polymer material. In any event, the polymer film is fabricated as will presently be described. The ionic material is a material capable of exchanging ions with the electrochromic material to serve as an ion donor or an ion acceptor.

Examples of the polymer materials are melamine resin, silicon resin, xylene resin, vinyl acetate resin, copolymer resin of vinyl chloride and vinyl acetate, polycarbonate resin, resin of cellulose derivatives, polyvinyl carbazole resin, polyether resin, such as polyethylene oxide and polypropylene oxide, acrylic resin, such as polyacrylonitrile and polymethacrylonitrile, and fluororesin, such as polyvinylidene fluoride. Moreover, the polymer material may be any one of other synthetic polymers that serves as a dispersion medium. It is preferred that the polymer material have a functional group having a strong polarity. Examples are acrylic resins and fluororesins. The polymer material may also be selected from derivatives of the materials exemplified above.

The organic electrochromic material may be any one of known organic electrochromic materials including the materials of the viologen family. Other examples are tetrathiafulvalene, arylpyrazoline, fluorene, benzoquinone, naphthoquinone, anthraquinone, pyrylium, pyridium, methylene blue, furil, other aromatic or heterocyclic compounds, and their derivatives. Still other examples are ferroine, ferrocene, complexes of diphthalocyanine and rare earth metals, and other organometallic compounds.

The ionic material may be selected from ordinary ion conductive materials and those other salts which have a low ionic conductivity and are not generally used as ionic materials. Examples are lead halides, alkali metal halides, alkaline earth metal halides, rare earth metal halides, halogenoalkyl ammonium, their solid solutions, a complex of an alkali metal halide and crown ether, halogenopyridines exemplified by iodo-1-n-butyl pyridinum, and like halogen ion conductive materials. Other examples are an acid serving as a proton conductive material, its hydrates, its ion exchange resins, and alkali ion conductive materials, such as oxides of transition metals serving as alkali ion conductive materials, alkali metals, alkali metal halides which serve also as halogen ion conductive materials, alkali metal perchlorates, alkali metal tetrafluoroborates, alkali metal hexafluorophosphates, alkali metal nitrides, alkali metal aluminum tetrafluorides, alkali metal aluminium tetrachlorides, alkali metal thiocyanates, alkali metal trifluoroacetates, $M_{14}Zn(GeO_4)_4$, and M-beta-alumina, where M represents an alkali metal. Still other examples are silver conductive materials, such as silver halides, and copper conductive materials, such as copper halides. Further examples are surfactants.

It may be mentioned here that a polymer electrochromic material can be prepared as integrated macromolecules or polymer molecules by subjecting at least one organic electrochromic material to covalent bonding. Alternatively, a polymer electrochromic material can be prepared as pendant macromolecules by subjecting at least one organic electrochromic material to covalent bonding with at least one polymer material. It is similarly possible to prepare a polymer ionic material either as integrated macromolecules by subjecting at least one ionic material to covalent bonding or as pendant macromolecules by subjecting at least one ionic material to covalent bonding with at least one polymer material. The ionic material for use in preparing integrated macromolecules is preferably an organic ionic material.

The polymer film may be a dispersed film consisting essentially of macromolecules of at least one polymer material in which film at least one organic electrochromic material and at least one ionic material are dispersed. Alternatively, another dispersed film may either consist essentially of a polymer electrochromic material in which film at least one ionic material is dispersed or consist essentially of a polymer ionic material in which film at least one organic electrochromic material is dispersed. As a further alternative, the high polymer film may essentially consist of a polymer electrochromic material and a polymer ionic material.

The solid electrolyte layer 14 is either a polymer film or layer comprising at least one solid electrolyte or a thin film of at least one solid electrolyte. Examples of the solid electrolyte are the ionic materials exemplified heretobefore. For the thin electrolyte film, it is possible to use a solid electrolyte having a small electrical conductivity.

The polymer electrolyte film may be an electrolyte dispersed film consisting essentially of macromolecules or polymer molecules of at least one polymer material in which film at least one ionic material is dispersed. Alternatively, the polymer electrolyte film may be a polyelectrolyte film consisting essentially of a polymer ionic material mentioned before. The thin electrolyte film may be formed by resorting to evaporation of at least one solid electrolyte, sputtering thereof, or a like technique.

The redox layer 18 consists, like the organic electrochromic layer 13, essentially of a polymer film or layer comprising at least one redox material and may or may not further comprise at least one ionic material. As described hereinabove, the redox material is a material which is readily subjected to a redox reaction when the operating voltage is applied to the display electrode 12 with respect to the counter electrode 15. Such a redox material may be selected from the organic electrochromic materials, other organic materials, such as quinones, and inorganic materials as, for example, berlinate and oxides of transition metals. The redox layer 18 is for facilitating transfer of electric charges to and from the counter electrode 15.

As is the case with the polymer electrochromic or ionic material, it is possible to prepare a polymer redox material as integrated macromolecules by subjecting at least one redox material to covalent bonding. It is also possible to prepare a polymer redox material as pendant macromolecules by subjecting at least one redox material to covalent bonding with at least one polymer material. The redox material to be used in preparing integrated macromolecules is preferably an organic redox material.

The redox polymer film may be a redox dispersed film consisting essentially of macromolecules of at least one polymer material in which film at least one redox material is dispersed together with or without at least one ionic material. Another redox dispersed film consists essentially of a polymer ionic material in which film at least one redox material is dispersed. Alternatively, the redox polymer film may consist essentially of a polymer redox material in which film at least one ionic material may or may not be dispersed. As a further alternative, the redox polymer film may consist essentially of a polymer redox material and a polymer ionic material.

When the redox layer 18 comprises an organic electrochromic material, it is possible as will shortly be described to carry out color switching of the display. That is, let the organic electrochromic material of the electrochromic layer 13 be colored upon oxidation and the organic electrochromic material of the redox layer 18, also upon oxidation. The displayed color is "switched" between the colors of the electrochromic and the redox layers 13 and 18 depending on the polarity of the operating voltage. This applies to another case where the organic electrochromic materials of the both layers 13 and 18 are colored upon reduction. When the organic electrochromic material of one of the electrochromic and the redox layers 13 and 18 is colored upon oxidation and that of the other of both layers 13 and 18, upon reduction, it is possible to vary the display between a display colored by a mixture of the colors of the two layers 13 and 18 and an achromatic or colorless "display." The mixed color is very convenient in achieving variously colored displays by using those two or more organic electrochromic materials in at least one of the two layers 13 and 18 which are colored either upon oxidation or reduction.

At least one of the organic electrochromic layer 13 and the redox layer 18 may include fine conductive powder as an additive. This unexpectedly raises the response speed. Typical conductive powder is tin oxide powder, ITO powder (a mixture of indium oxide powder and tin oxide powder), $SnO_2/TiO_2$ powder (titanium oxide powder clad or coated with stannic oxide), or carbon powder. The tin oxide powder is transparent. The ITO powder gives a pale yellow shade to a background of the colored display. The $SnO_2/TiO_2$ powder gives a white background. The particle size is not critical. Merely for convenience of handling, the powder may have a particle size between 0.1 micron and 100 microns. The particles may or may not be spherical.

At least one of the organic electrochromic layer 13, the solid electrolyte layer 14, and the redox layer 18 may include fine reflective powder either as an additive or an additional additive. The reflective powder may be white powder, such as alumina powder or titanium oxide powder. This gives a white background to the colored display. The reflective powder may be colored powder capable of selectively reflecting incident rays.

At least one of the organic electrochromic layer 13, the polymer electrolyte layer 14, and the redox layer 18 may include a cross-linking or bridge-bonding agent either as an additive or an additional additive. The cross-linking agent serves as a stabilizer and contributes to the stability of the layer 13, 14, and/or 18, such as resistance against surrounding conditions, and also to the mechanical strength of the layer or layers. Furthermore, the cross-linking agent is effective in improving the adhesion to the contiguous layers and to the adjacent electrode.

The cross-linking agent may be selected from those which are known in polymer chemistry and the fields of pigment printing and photoresist formation and have a structure of the type wherein two or three functional groups are interconnected by an organic compound as will presently be illustrated. Each functional group may include oxygen, sulfur, nitrogen, halogen, or the like and should be capable of reacting with the macromolecules under the influence of light or heat. The organic compound is preferably a chain hydrocarbon compound. The cross-linking agent may preliminarily be included in a coating solution for the layer 13, 14, and/or 18 and is made to form cross linking or bridge bonding among the macromolecules by light or heat after formation of color active materials.

Examples of thermally cross-linking agents are:

Methyl-di-(2-chloroethyl)-monoazane: $CH_3N(CH_2CH_2Cl)_2$; (a)
Di-(2-chloroethyl)-thioether: $S(CH_2CH_2Cl)_2$; (b)

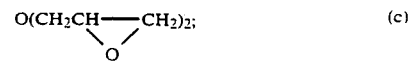
(c)

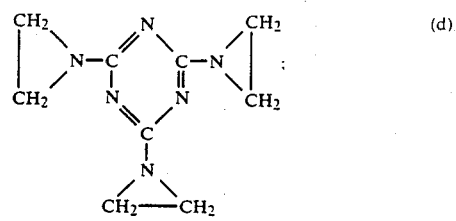
(d)

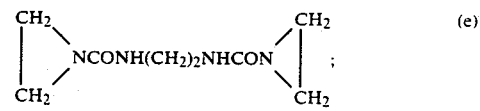
(e)

$CH_3SO_3(CH_2)_nO_3SCH_3$; (f)
$CH_2=CH-SO_2-CH=CH_2$; (g)

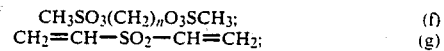
(h)

$ClCH_2O(CH_2)_nOCH_2Cl$; and (i)
$Cl-COO(CH_2)_nOOC-Cl$. (j)

Examples of optically cross-linking agents are mostly of the bis-diazide family and are:
(a) 4,4'-diazide chalcone;
(b) 2,6-di-(4'-azidobenzylidene)-cyclohexanone;
(c) 2,6-di-(4'-azidobenzylidene)-4-methylcyclohexanone; and
(d) 2,6-di-(4'-azidohenzylidene)-4-hydroxycyclohexanone.

At least one of the organic electrochromic layer 13, the polymer electrolyte layer 14, and the redox layer 18 may include a plasticizer as an additive or an additional additive. The plasticizer raises the moldability. In addition, the plasticizer is effective for thermal agitation of the macromolecules and is helpful for dissociation of the ionic material thereby to raise the number of ions and the ion mobility in the color active material, the ion conductivity, and the response speed.

The plasticizer may be selected from ordinary plasticizers. Examples are phthalic diesters exemplified by dioctyl phthalate and dipentyl phthalate, esters of aliphatic dibasic acids exemplified by dioctyl adipate, phosphoric esters exemplified by dibutyl phosphate, ether compounds exemplified by o-nitrophenyloctyl ether and diphenyl ether, glycol ester, epoxy compounds, and polymers of such ordinary plasticizer or plasticizers. Examples of other plasticizers are propylene carbonate, ethylene carbonate, γ-butylolactone, like material with high dielectric constant, and several organic compounds which are used as liquid crystals as, for example, N-(4-ethoxybenzilidene-4'-n-butylaniline).

At least one of the organic electrochromic layer 13, the solid electrolyte layer 14, and the redox layer 18 may include an antioxidant and/or an ultraviolet-rays absorbing material, as either an additive or an additional additive. The antioxidant or the ultraviolet-rays absorbing material serves as a stabilizer and may be one of the materials usually used in a polymer material. This improves the resistance against surrounding conditions and lengthens the life.

Examples of all-solid-state organic electrochromic display devices according to this invention will now be described in detail. Throughout the examples, the percentage of a polymer is given by mols of the corresponding monomer. Merely for convenience, a coating solution was coated by resorting to the spinner method. Several additional examples will also be given for the materials, such as solvents, to be used in fabricating various layers of all-solid-state organic electrochromic display devices according to this invention. Parts used for the solvents are by volume.

EXAMPLE I

Referring back to FIG. 3 at first, a transparent ITO display electrode 12 was formed by vacuum evaporation on a transparent glass cover plate 11. In the meanwhile, a coating solution for a dispersed electrochromic layer 13 was prepared by dissolving 0.75 mol/liter of polymethacrylonitrile (a high polymer material), 0.1 mol/liter of tetrathiafulvalene (an organic electrochromic material), and 0.2 mol/liter of lithium perchlorate (an ionic material) in propylene carbonate. The coating solution was coated on the display electrode 12 to a thickness of 2.3 microns to provide a coated plate. An organic electrochromic layer 13 was fabricated by completely drying the coating solution. For this purpose, the coating solution was dried by leaving the coated plate at first in a nitrogen atmosphere of an oven for eight hours with the oven preparatorily uniformly heated to 80° C. Subsequently, the coating solution was completely dried by keeping the coated plate in an evacuated oven for two hours with the oven preliminarily uniformly heated to 60° C. The conditions for completely drying the coating solution will be referred to as the drying process of Example I.

A counter electrode 15 was formed directly on the organic electrochromic layer 13 by evaporating gold to a thickness of 0.1 micron. A laminate thus fabricated was covered with a casing 16 of polystyrene resin. A highly reliable all-solid-state organic electrochromic display device was obtained.

The display electrode 12 was supplied with a negative operating voltage with respect to the counter electrode 15. A deep red display appeared on a gold-colored background. On reversal of the polarity of the operating voltage, the display disappeared. In practice, an operating voltage of −3.5 volts gave rise to the red display. The daylight contrast grew to 3:1 in 5 seconds. When the polarity was reversed to +3.5 volts, the display completely disappeared in 5 seconds.

EXAMPLE II

A sample was manufactured as in Example I except for fabrication of the casing 16. Although less reliable, the performance was similar.

EXAMPLE III

An all-solid-state organic electrochromic display device was manufactured as in Example I with the electrochromic layer 13 fabricated as follows. A coating solution was prepared by dissolving 0.4 mol/liter of polymethacrylonitrile, 0.1 mol/liter of 1,3-di-(p-methoxyphenyl)-5-(p-hydroxyphenyl)-$\Delta^2$-pyrazoline, and 0.1 mol/liter of lithium perchlorate in a solvent prepared by mixing 4 parts of cyclohexanone and 1 part of propylene carbonate. After being applied onto the display electrode 12 to a thickness of 0.6 micron, the coating was dried like in Example I at first at 60° C. in the nitrogen atmosphere for two hours and then again at 60° C. in vacuum for two hours.

The display electrode 12 was supplied with a positive operating voltage of +1.5 volts relative to the counter electrode 15. A deep yellow display appeared. The daylight contrast rose to 3:1 in 3 seconds. When the polarity was reversed to −1.5 volts, the display completely disappeared in 3 seconds.

EXAMPLE IV

An all-solid-state organic electrochromic display device was manufactured as in Example III except that 1,5-di-(p-methoxyphenyl)-3-morphorinophenol-$\Delta^2$-pyrazoline was used as the organic electrochromic material. By application of a positive operating voltage of +1.5 volts, a red display appeared and reached a daylight contrast of 3:1 in 3 seconds. By reversal to −1.5 volts, the display completely disappeared in 3 seconds.

EXAMPLE V

An all-solid-state organic electrochromic display device was manufactured as in Example III with furil used as the organic electrochromic material. By the use of a negative operating voltage of −1.5 volts, a blue display appeared and rose to a daylight contrast of 3:1 in 3 seconds. The display completely disappeared in 3 seconds by reversal of the voltage to +1.5 volts.

EXAMPLE VI

An all-solid-state organic electrochromic display device was manufactured as in Example III by using a coating solution including a combination of two organic electrochromic materials rather than a single organic electrochromic material. The combination was 0.08 mol/liter of 1-p-methoxyphenyl-3-p-dimethylaminostyryl-5-p-dimethylaminophenyl-$\Delta^2$-pyrazoline and 0.08 mol/liter of phenyl-p-benzoquinone.

By application of a positive operating voltage of +1.5 volts, a dark green display appeared and reached a daylight contrast of 3:1 in 2 seconds. The display completely disappeared in 4 seconds by reversal of the voltage to −0.5 volt.

EXAMPLE VII

An all-solid-state organic electrochromic display device was manufactured as in Example III with a combination of two organic electrochromic materials used instead of a single organic electrochromic material. The combination was 0.08 mol/liter of 1-phenyl-3-p-diethylaminophenyl-5-phenyl-$\Delta^2$-pyrazoline and 0.08 mol/liter of phenyl-p-benzoquinone. An orange display reached a daylight contrast of 3:1 in 2 seconds by the use of a positive operating voltage of +1.5 volts. The display completely disappeared in 4 seconds upon reversal of the voltage to −0.3 volt.

EXAMPLE VIII

All-solid-state organic electrochromic display devices were manufactured as in Example III by using (1) polyvinylidene fluoride and (2) polyacrylonitrile as the polymer material. No change was observed in performance including the displayed color and the response speed.

EXAMPLE IX

An all-solid-state organic electrochromic display device was manufactured approximately as in Example I with fine powder of titanium oxide added to the coating solution in an amount which was equal to the polymer material by weight. The display device looked white while in a non-operated state. By application of a negative operating voltage of −3.5 volts, a red display appeared on a white background and rose to a daylight contrast of 3:1 in 5 seconds.

EXAMPLE X

An all-solid-state organic electrochromic display device was manufactured approximately as in Example I. A coating solution including a cross-linking agent was prepared by dissolving 0.75 mol/liter of polymethacrylonitrile, 0.1 mol/liter of 1,3,5-tri(p-methoxyphenyl)-5-(p-hydroxiphenyl)-$\Delta^2$-pyrazoline, 0.2 mol/liter of lithium perchlorate, and 0.01 mol/liter of methylene-bis-acrylamide in a mixture of 4 parts of cyclohexanone and 1 part of propylene carbonate. The coating solution was coated on the display electrode 12 to a thickness of 1 micron. A half-fabricated organic electrochromic layer including the cross-linking agent was fabricated by keeping the coated plate in a nitrogen atmosphere of an oven for two hours with the oven preliminarily uniformly heated to 80° C.

The thereby completely dried plate was exposed in air to ultraviolet rays of a mercury lamp of a 3-kW output for one minute. A cross-linked organic electrochromic layer 13 was fabricated by maintaining the temperature of the plate between 60° C. and 70° C. during irradiation of the ultraviolet rays. A counter electrode 15 was formed directly on the electrochromic layer 13 by evaporating gold to a thickness of 0.3 millimicron in vacuum. A casing 16 was formed by the use of epoxy resin.

When a positive operating voltage of +3.5 volts was applied, a green display appeared and reached a daylight contrast of 3:1 in 5 seconds. The display completely disappeared in 6 seconds by reversal of the voltage to −3 volts. The operation was satisfactorily repeated at 30° C. in an atmosphere of 100% relative humidity.

EXAMPLE XI

An all-solid-state organic electrochromic display device was manufactured as in Example X. A coating solution including a cross-linking agent and fine white powder was prepared by dissolving 0.1 mol/liter of polystylene with butyl anthraquinone, 0.1 mol/liter of a polymer complex of lithium chloride and crown ether, and 0.02 mol/liter of methyl-di(2-chloroethyl)-monoazane in propylene carbonate with fine powder of alumina added in an amount which was equal by weight to the solvent. After coating, the coating solution was completely dried. A cross-linked organic electrochromic layer 13 with white powder was fabricated by heating the dried plate at 120° C. for three hours.

With a negative operating voltage of −2.5 volts, a red display appeared on a white background and rose to a daylight contrast of 3:1 in about 5 seconds. The display completely disappeared in 7 seconds by reversal of the voltage to +2.5 volts. Operation was satisfactorily repeated at 30° C. in an atmosphere of 100% relative humidity.

EXAMPLE XII

An all-solid-state organic electrochromic display device was manufactured substantially as in Example X. A coating solution with a plasticizer and white powder was prepared by dissolving 0.75 mol/liter of polymethacrylonitrile, 0.1 mol/liter of tetrathiafulvalene, 0.2 mol/liter of lithium perchlorate, and 0.02 mol/liter of dioctyl adipate in cyclohexanone with fine alumina powder added in an amount equal to the solvent by weight. The coating was dried according to the drying process of Example I.

With a positive operating voltage of +3 volts, a red display appeared on a white background. The daylight contrast of 3:1 was reached in 3 seconds. Reversal of the voltage to −3 volts resulted in complete disappearance of the display in 5 seconds.

EXAMPLE XIII

Turning back to FIG. 1, An assembly of a cover plate 11 and a display electrode 12 was manufactured as in Example I. In the meantime, an electrochromic coating solution was prepared by dissolving 0.75 mol/liter of polymethacrylonitrile, 0.1 mol/liter of tetrathiafulvalene, and 0.2 mol/liter of lithium perchlorate in propylene carbonate. Moreover, an electrolyte coating solution was prepared by dissolving 0.75 mol/liter of polymethacrylonitrile and 0.2 mol/liter of lithium perchlorate in propylene carbonate. The electrochromic coating solution was coated on the display electrode 12 to a thickness of 1 micron. An organic electrochromic layer 13 was fabricated by processing the coating in accordance with the drying process of Example I.

The electrolyte coating solution was applied onto the electrochromic layer 13 to a thickness of 1 micron. A polymer (polymethacrylonitrile including) electrolyte layer 14 was fabricated by using the drying process of Example I. A counter electrode 15 was formed on the solid electrolyte layer 14 to a thickness of 0.3 millimicron. Highly reliable all-solid-state organic electrochromic display devices were obtained by forming casings 16 with sealing materials, such as (1) epoxy resin and (2) alkyl resin.

When a positive operating voltage of +3 volts was applied to the display electrode 12 of each all-solid-state organic electrochromic display device, a red display appeared on a gold-colored background. The daylight contrast grew to 3:1 in about 2 seconds. Reversal of the voltage to −3 volts resulted in complete disappearance of the display in 3 seconds.

EXAMPLE XIV

An all-solid-state organic electrochromic display device was manufactured as in Example XIII by using an electrochromic coating solution obtained by dissolving 0.1 mol/liter of polystylene with butylanthraquinone and 0.1 mol/liter of a complex polymer of lithium chloride and crown ether in a mixture of 4 parts of cyclohexanone and 1 part of propylene carbonate. A negative operating voltage of −2.5 volts gave rise to a red display of a daylight contrast of 3:1 in about 2 seconds. The display completely disappeared in 3 seconds by reversal of the voltage to +2.5 volts.

EXAMPLE XV

An all-solid-state organic electrochromic display device was manufactured as in Example XIII by the use of an electrolyte coating solution including white powder. The solution was prepared by dissolving 0.1 mol/liter of a complex polymer of lithium chloride and crown ether in cyclohexanone with fine alumina powder added in an amount equal to the weight of the solvent. With a positive operating voltage of +3 volts, a red display appeared on a white background and reached a daylight contrast of 3:1 in 5 seconds. The display completely disappeared in 5 seconds by reversal of the voltage to −3 volts.

EXAMPLE XVI

An all-solid-state organic electrochromic display device was manufactured as in Example XV. An electrochromic coating solution was prepared by dissolving 2 mols/liter of polyacrylonitrile, 1 mol/liter of tetrathiafulvalene, 1 mol/liter of furil, and 1 mol/liter of lithium perchlorate in dimethylformamide. An electrolyte coating solution including white powder was prepared by dissolving 0.75 mol/liter of polymethacrylonitrile and 0.2 mol/liter of lithium perchlorate in propylene carbonate with fine powder of titanium oxide added in an amount equal by weight to the solvent.

By the use of a positive operating voltage of +2 volts, a red display appeared on a white background and rose to a daylight contrast of 3:1 in 3 seconds. With a negative operating voltage of −2 volts, a blue display appeared on the white background and reached a daylight contrast of 3:1 also in 3 seconds. Each display completely disappeared in 4 seconds when the display electrode was supplied with 0 volt relative to the counter electrode 15.

EXAMPLE XVII

An all-solid-state organic electrochromic display device was manufactured as in Example XIII by using an electrochromic coating solution including fine conductive powder. The electrochromic coating solution was prepared by dissolving 0.75 mol/liter of polymethacrylonitrile, 0.1 mol/liter of tetrathiafulvalene, 0.2 mol/liter of lithium perchlorate, and 1 kg/liter of fine conductive powder of stannic oxide and titanium oxide in propylene carbonate.

Application of a positive operating voltage of +2 volts resulted in a deep red display on a white background with a daylight contrast of 3:1 reached in 0.5 second. The display completely disappeared in 0.5 second by reversal of the voltage to −2 volts.

EXAMPLE XVIII

Turning to FIG. 4, an assembly of a cover plate 11 with a display electrode 12 was manufactured as in Example I. A thin inorganic solid electrolyte layer 14 of lithium aluminium tetrafluoride was formed directly on the display electrode 12 by vacuum evaporation of a mixture of lithium fluoride and aluminium fluoride with the mixture heated by resistance heating. An organic electrochromic layer 13 and a counter electrode 15 were successively fabricated on the electrolyte layer 14 and then encased in a casing 16 as in Example III to provide an all-solid-state organic electrochromic display device of an excellent reliability.

A lower negative operating voltage of −1.2 volts was successful to achieve a daylight contrast of 3:1 of a deep yellow display on a gold-colored background in 3 seconds. A lower reversed voltage of +1.2 volts was sufficient to make the display completely disappear in 3 seconds.

EXAMPLE XIX

Referring to FIG. 6, a display electrode 12 and a counter ITO electrode 15 were formed on a cover plate 11 and a glass bottom plate 15, respectively, as in Example I. Meanwhile, an electrochromic coating solution was prepared by dissolving 2 mols/liter of polyacrylonitrile, 1 mol/liter of furil, 1 mol/liter of 18-crown-6-ether lithium bromide in dimethyl formamide. In addition, an electrolyte coating solution was prepared by dissolving 2 mols/liter of polyacrylonitrile and 1 mol/liter of 18-crown-6-ether lithium bromide in propylene carbonate. The electrochromic and the electrolyte coating solutions were coated directly on the display and the counter electrodes 12 and 15, respectively, each to a thickness of 1 microns. An organic electrochromic layer 13 and a polymer electrolyte layer 14 were fabricated on the display and the counter electrodes 12 and 15, respectively, by maintaining the two coated plates in a nitrogen atmosphere of an oven for two hours with the oven preliminarily heated to 130° C.

Two plates thereby obtained were stacked on each other in vacuum with the electrochromic and the electrolyte layers 13 and 14 brought into contact with each other. The stacked plates were kept at a temperature of 150° C. in vacuum for one hour with the stack subjected to a pressure of 100 grams/cm². A highly reliable all-solid-state organic electrochromic display device was eventually manufactured by forming a casing having side walls 16' and 16" by a sealing material.

By using a negative operating voltage of −2 volts, a deep blue display appeared and reached a daylight contrast of 2:1 in 3 seconds. The display completely disappeared in 3 seconds by reversal of the voltage to +2 volts. The display device is useful as a display device of a transparent type.

EXAMPLE XX

Referring now to FIG. 5, a display electrode 12 was formed on a cover plate 11 as in Example I. In the meantime, an electrochromic coating solution was prepared by dissolving 0.75 mol/liter of polymethacrylonitrile, 0.1 mol/liter of tetrathiafulvalene, and 0.2 mol/liter of lithium perchlorate in a mixture of 4 parts of cyclohexanone and 1 part of propylene carbonate. Moreover, a redox coating solution was prepared, like the electrochromic coating solution, with furil substituted as a redox material for the tetrathiafulvalene in the electrochromic coating solution. An organic electrochromic layer 13 was fabricated on the display electrode 12 as in Example XIII.

A redox layer 18 was fabricated on the electrochromic layer 13 by treating the redox coating solution again as in Example XIII. A counter electrode 15 was formed on the redox layer 18 by evaporating gold in vacuum to a thickness of 0.3 micron. A highly reliable all-solidstate organic electrochromic display device was manufactured by forming a casing 16 with epoxy resin.

As would have been seen from the foregoing, tetrathiafulvalene is an organic electrochromic material and gives a red display upon oxidation. Furil is also an organic electrochromic material, which gives a blue display when reduced. By application of a positive operating voltage of +2 volts, a very dark red-purple display appeared on a gold-colored background and rose to a daylight contrast of 3:1 in 2 seconds. The display completely disappeared in 1.5 seconds by reversal of the voltage to −2 volts.

EXAMPLE XXI

All-solid-state organic electrochromic display devices were manufactured as in Example XX with (1) 0.2 mol/liter of lithium hexafluorophosphate and (2) 0.2 mol/liter of lithium tetrafluoroborate used as an ionic material in each of the electrochromic and the redox coating solutions used in Example XX. A positive operating voltage of +2 volts resulted in a red-purple display, which reached a daylight contrast of 3:1 in 2 meconds. The display completely disappeared in 2 seconds upon reversal of the voltage to −2 volts.

EXAMPLE XXII

An all-solid-state organic electrochromic display device was manufactured approximately as in Example X. A redox coating solution was prepared with phenyl-p-benzoquinone substituted for the organic electrochromic material in the electrochromic coating solution used in Example X. A redox layer 18 was fabricated on the cross-linked organic electrochromic layer 13 by subjecting the redox coating solution to the coating, the drying, and the cross-linking processes as in Example X. A counter electrode 15 and a casing 16 were formed again as in Example X. It was confirmed that the cross-linking processes for the electrochromic and the redox layers 13 and 18 were effective in completely suppressing polymerization in less degrees. With a positive operating voltage of +1.5 volts, a deep green display appeared and reached a daylight contrast of 3:1 in 2 seconds. The display completely disappeared in 2 seconds by reversal of the voltage to −1.5 volts.

EXAMPLE XXIII

Turning to FIG. 8, two assemblies were manufactured as in Example XIX. Preliminarily, an electrochromic coating solution was prepared by dissolving 0.75 mol/liter of polymethacrylonitrile, 0.1 mol/liter of tertiary-butylanthraquinone, and 0.2 mol/liter of a complex of dibenzo-18-crown-6-ether lithium chloride in propylene carbonate. Furthermore, a redox coating solution was prepared by substituting 0.1 mol/liter of furil for the electrochromic material of the electrochromic coating solution. An organic electrochromic layer 13 was fabricated on the display electrode 12 as in Example I. A redox layer 18 was fabricated on the counter electrode as in Example XIII.

Two stacks thereby fabricated were subjected to the integrating process as in Example XIX. An all-solid-state organic electrochromic display device was obtained by enclosing the integrated stacks with a casing having side walls 16′ and 16″ as in Example XIX.

A negative operating voltage of −1.5 volts resulted in a red display, which reached a daylight contrast of 2:1 in 2 seconds. A positive operating voltage of +1.5 volts gave rise to a blue display, which attained the daylight contrast of 2:1 in 2 seconds. When the display electrode 12 was kept at the electric potential of the counter electrode 15, each display disappeared to render the display device transparent.

EXAMPLE XXIV

Referring to FIG. 2, an assembly was formed as in Example I. Meanwhile, an electrochromic coating solution was prepared by dissolving 0.75 mol/liter of polymethacrylonitrile, 0.1 mol/liter of tetrathiafulvalene, and 0.2 mol/liter of lithium perchlorate in propylene carbonate. An electrolyte coating solution was prepared by dissolving 0.75 mol/liter of polymethacrylonitrile and 0.2 mol/liter of lithium perchlorate in propylene carbonate. Moreover, a redox coating solution was prepared by dissolving 0.75 mol/liter of polymethacrylonitrile and 0.1 mol/liter of furil in propylene carbonate.

An organic electrochromic layer 13 was fabricated by resorting to the drying process of Example I. The electrolyte coating solution was coated on the electrochromic layer 13 to a thickness of 1 micron. A polymer electrolyte layer 14 was fabricated by using the drying process of Example I. The redox coating solution was applied onto the electrolyte layer 14 to a thickness of 1 micron. A redox layer 18 was fabricated by the use of the drying process of Example I. A counter electrode 15 was formed by evaporating gold onto the redox layer 18 in vacuum to a thickness of 0.3 millimicron. Thus fabricated stacks were encased in casings 16 of sealing materials, such as (1) epoxy resin and (2) alkyl resin. Highly reliable all-solid-state organic electrochromic display devices were obtained.

When a positive operating voltage was used, a deep red display appeared on a gold-colored background. With a negative operating voltage, a deep blue display appeared on the gold-colored background. Each display disappeared when the voltage was rendered zero. For the practical purposes, an operating voltage of +1.5 volts was used to get a purple display on the gold-colored background. The daylight contrast rose to 3:1 in 6 seconds. The display completely disappeared in 4 seconds when the voltage was reversed to −1.5 volts.

EXAMPLE XXV

All-solid-state organic electrochromic display devices were manufactured as in Example XXIV with (1) 0.2 mol/liter of lithium tetrafluoroborate and (2) 0.2 mol/liter of lithium hexafluorophosphate substituted for the lithium perchlorate in each of the electrochromic and the redox coating solutions. A purple display of a daylight contrast of 3:1 was obtained in 3 seconds by the use of a positive operating voltage of 1.5 volts. The display completely disappeared in 2 seconds when the voltage was reversed to −1.5 volts.

EXAMPLE XXVI

An all-solid-state organic electrochromic display device was manufactured as in Example XXV except that fine alumina powder was added to the electrolyte coating solution in an amount equal by weight to the solvent. An operating voltage of +1.5 volts gave rise to a bright purple display on a white background. The daylight contrast reached 3:1 in 3 seconds. The display completely disappeared in 2 seconds by reversal of the voltage to −1.5 volts.

EXAMPLE XXVII

An all-solid-state organic electrochromic display device was manufactured as in Example XXXVI except for the use of an electrochromic coating solution prepared by dissolving 0.1 mol/liter of polystylene with pyrazoline and 0.1 mol/liter of lithium tetrafluoroborate in a mixture of 4 parts of cyclohexanone and 1 part of ethylene carbonate. With an operating voltage of +1.5 volts, a bright green display of a daylight contrast of 4:1 appeared in 2 seconds on a white background. The display completely disappeared in 1 second by reversal of the voltage to −1.5 volts.

EXAMPLE XXVIII

An all-solid-state organic electrochromic display device was manufactured approximately as in Example XXVII. An organic electrochromic layer 13 was fabricated as in Example XVII rather than as in Example XXVII. A high polymer electrolyte layer 14 including fine reflective powder was fabricated on the electrochromic layer 13 by using an electrolyte coating solution prepared by adding 1 kg/liter of fine alumina powder to the electrolyte coating solution used in Example XVII. A redox coating solution including fine conductive powder was prepared by dissolving 0.75 mol/liter of polymethacrylonitrile, 0.1 mol/liter of furil, 0.2 mol/liter of lithium perchlorate, and 1 kg/liter of fine tin oxide powder in propylene carbonate. A redox layer 18 was fabricated by coating the redox coating solution on the electrolyte layer 14 to a thickness of 1 micron and subjecting the coating to the drying process of Example I. The counter electrode 15 and the casing 16 were formed as in Example XVII.

An operating voltage of +1.0 volt made a red display appear on a white background and reach a daylight contrast of 3:1 in 0.5 second. The display completely disappeared in 0.5 second upon reversal of the voltage to −1.0 volt.

EXAMPLE XXIX

With reference to FIG. 7, two assemblies were formed as in Example XIX or XXIII. In the meantime, an electrochromic coating solution was prepared by dissolving 0.1 mol/liter of furil and 0.3 mol/liter of a complex polymer of lithium chloride and crown ether in a mixture of 4 parts of cyclohexanone and 1 part of propylene carbonate. A redox coating solution was prepared by dissolving 0.1 mol/liter of a complex polymer of lithium chloride and crown ether and 0.1 mol/liter of butylanthraquinone in a mixture of 4 parts of cyclohexanone and 1 part of propylene carbonate. Furthermore, an electrolyte coating solution was prepared by dissolving 0.1 mol/liter of a complex polymer of lithium chloride and crown ether in a mixture of 4 parts of cyclohexanone and 1 part of propylene carbonate.

An organic electrochromic layer 13 was fabricated on the display electrode 12 as in Example XXIV. A polymer electrolyte layer 14 was fabricated on the electrochromic layer 13 again as in Example XXIV. A redox layer 18 was fabricated as in Example XXIV on the counter electrode 15 rather than on the electrolyte layer 14. Two plates thus obtained were stacked on each other in vacuum with the electrolyte layer 14 brought into contact with the redox layer 18. A thereby obtained stack was kept at 150° C. in vacuum for one hour under a pressure of 1 kg/cm². A casing with side walls 16′ and 16″ was formed with a sealing material. A highly reliable all-solid-state organic electrochromic display device was obtained.

By application of a negative operating voltage of −1.5 volts, the furil is reduced to give a blue display. The display rose to a daylight contrast of 2:1 in 3 seconds. With a positive operating voltage of +1.5 volts, the butylanthraquinone is reduced. A red display reached a daylight contrast of 2:1 in 3 seconds. When the voltage was reduced to zero, each display completely disappeared in 3 seconds.

Now reviewing Examples I through XXIX, it may be pointed out here that the electrochromic layer 13 has a possibility of giving rise to a colored display when either a positive or a negative operating voltage is applied to the display electrode 12 relative to the counter electrode 15. A colored display nevertheless appears in Examples I through XII in response to only one of the positive and the negative operating voltages. This is because the electrochromic layer 13 has different redox potentials in relation to the ITO display electrode 12 and the gold counter electrode 15 and because the operating voltage has a small absolute value. In Examples XVII and XXVIII, the fine conductive powder is very effective in raising the response speed.

In FIGS. 1 through 8, an electrochromic display device comprises a substantially transparent display electrode 12, a counter electrode 15, and an organic electrochromic layer 13 between the display and the counter electrodes 12 and 15. The electrochromic layer 13 has a first and a second surface, which are ordinarily parallel to each other. In the display device depicted in FIG. 3, the display and the counter electrodes 12 and 15 are in direct contact with the first and the second surfaces, respectively. Incidentally, the display electrode 12 and the organic electrochromic layer 13 are readily given a predetermined geometrical configuration either by the conventional photoetching method or the conventional mask technique to provide segmented displays. If desired in particular cases, the redox layer 18 and/or the electrolyte layer 14 may be readily given a like geometrical configuration.

While this invention has thus far been described in connection with an appreciable number of examples, it is now understood that the all-solid-state organic electrochromic display device according to this invention is featured by a thin thickness. Furthermore, the polymer used in the electrochromic layer 13 and also in the redox layer 18 renders such a layer 13 or 18 tenaciously adhesive to the adjacent layer or electrode by the excellent moldability, protects the organic electrochromic material and the redox material from the surrounding conditions including the humidity, and reduces the cost of manufacture because the polymer is convenient for a large-scale production. The ionic material included in the electrochromic and/or the redox layer 13 and 18 raises the ion mobility to give a quicker response even without the fine conductive powder. Finally, it should be noted in the following claims that macromolecules or polymer may or may not be cross-linked even when the layer or layers are not specifically called "cross-linked."

What is claimed is:

1. An all-solid-state electrochromic display device comprising a substantially transparent electrode, a counter electrode, and an electrochromic layer between said transparent and said counter electrodes, wherein said electrochromic layer consists essentially of a polymer electrochromic film comprising at least one organic electrochromic material and at least one ionic material.

2. An all-solid-state electrochromic display device comprising a substantially transparent electrode, a counter electrode, and a polymer electrochromic film between said transparent and said counter electrodes, wherein said polymer electrochromic film consists essentially of macromolecules of at least one polymer material, with at least one organic electrochromic material and at least one ionic material dispersed in said film.

3. An all-solid-state electrochromic display device as claimed in claim 2, said polymer electrochromic film having a first and a second surface, wherein said transparent and said counter electrodes are in direct contact with said first and said second surfaces, respectively.

4. An all-solid-state electrochromic display device as claimed in claim 2, further comprising a solid electrolyte layer between said polymer electrochromic film and said transparent electrode.

5. An all-solid-state electrochromic display device as claimed in claim 2, further comprising a solid electrolyte layer between said polymer electrochromic film and said counter electrode.

6. An all-solid-state electrochromic display device as claimed in claim 5, further comprising a redox layer between said electrolyte layer and said counter electrode.

7. An all-solid-state electrochromic display device as claimed in claim 6, wherein said redox layer consists essentially of a polymer redox film comprising at least one redox material.

8. An all-solid-state electrochromic display device as claimed in claim 7, wherein said polymer redox film consists essentially of macromolecules of at least one polymer material, said at least one redox material being dispersed in said polymer redox film.

9. An all-solid-state electrochromic display device as claimed in claim 7, wherein said polymer redox film consists essentially of a polymer redox material comprising said at least one redox material.

10. An all-solid-state electrochromic display device as claimed in claim 7, wherein said polymer redox film further comprises at least one ionic material.

11. An all-solid-state electrochromic display device as claimed in claim 10, wherein said polymer redox film consists essentially of macromolecules of at least one polymer material, said at least one redox material and said at least one ionic material being dispersed in said polymer redox film.

12. An all-solid-state electrochromic display device as claimed in claim 10, wherein said polymer redox film consists essentially of a polymer redox material comprising said at least one redox material, said at least one ionic material being dispersed in said polymer redox film.

13. An all-solid-state electrochromic display device as claimed in claim 10, wherein said polymer redox film consists essentially of a polymer redox material and a polymer ionic material, said polymer redox material comprising said at least one redox material, said polymer ionic material comprising said at least one ionic material.

14. An all-solid-state electrochromic display device as claimed in any one of claims 7 through 13, wherein said polymer redox film is cross-linked.

15. An all-solid-state electrochromic display device as claimed in claim 14, wherein said cross-linked polymer redox film comprises at least one additive selected from a group consisting of conductive powder, at least one plasticizer, and reflective powder.

16. An all-solid-state electrochromic display device as claimed in any one of claims 7 through 13, wherein said polymer redox film comprises at least one additive selected from a group consisting of conductive powder, at least one plasticizer, and reflective powder.

17. An all-solid-state electrochromic display device as claimed in any one of claims 4 through 13, wherein said electrolyte layer is a dispersed film consisting essentially of macromolecules of at least one polymer material with at least one ionic material dispersed in said film.

18. An all-solid-state electrochromic display device as claimed in any one of claims 4 through 13, wherein said electrolyte layer is a polyelectrolyte film consisting essentially of a polymer ionic material.

19. An all-solid-state electrochromic display device as claimed in any one of claims 4 through 13, wherein said electrolyte layer consists essentially of at least one inorganic solid electrolyte material.

20. An all-solid-state electrochromic display device comprising a substantially transparent electrode, a counter electrode, and a polymer electrochromic film between said transparent and said counter electrodes, wherein said polymer electrochromic film consists essentially of a polymer electrochromic material comprising at least one organic electrochromic material, with at least one ionic material dispersed in said polymer electrochromic film.

21. An all-solid-state electrochromic display device as claimed in claim 20, said polymer electrochromic film having a first and a second surface, wherein said transparent and said counter electrodes are in direct contact with said first and said second surfaces, respectively.

22. An all-solid-state electrochromic display device as claimed in claim 20, further comprising a solid electrolyte layer between said polymer electrochromic film and said transparent electrode.

23. An all-solid-state electrochromic display device as claimed in claim 20, further comprising a solid electrolyte layer between said polymer electrochromic film and said counter electrode.

24. An all-solid-state electrochromic display device as claimed in claim 23, further comprising a redox layer between said electrolyte layer and said counter electrode.

25. An all-solid-state electrochromic display device as claimed in claim 24, wherein said redox layer consists essentially of a polymer redox film comprising at least one redox material.

26. An all-solid-state electrochromic display device as claimed in claim 25, wherein said polymer redox film consists essentially of macromolecules of at least one polymer material, said at least one redox material being dispersed in said polymer redox film.

27. An all-solid-state electrochromic display device as claimed in claim 25, wherein said polymer redox film consists essentially of a polymer redox material comprising said at least one redox material.

28. An all-solid-state electrochromic display device as claimed in claim 25, wherein said polymer redox film further comprises at least one ionic material.

29. An all-solid-state electrochromic display device as claimed in claim 28, wherein said polymer redox film consists essentially of macromolecules of at least one polymer material, said at least one redox material and said at least one ionic material dispersed in said polymer redox film.

30. An all-solid-state electrochromic display device as claimed in claim 28, wherein said polymer redox film consists essentially of a high polymer redox material comprising said at least one redox material, said at least one ionic material being dispersed in said polymer redox film.

31. An all-solid-state electrochromic display device as claimed in claim 28, wherein said polymer redox film consists essentially of a polymer redox material and a polymer ionic material, said polymer redox material comprising said at least one redox material, said polymer ionic material comprising said at least one ionic material.

32. An all-solid-state electrochromic display device as claimed in any one of claims 25 through 31, wherein said polymer redox film is cross-linked.

33. An all-solid-state electrochromic display device as claimed in claim 32, wherein said cross-linked polymer redox film comprises at least one additive selected from a group consisting of conductive powder, at least one plasticizer, and reflective powder.

34. An all-solid-state electrochromic display device as claimed in any one of claims 25 through 31, wherein said polymer redox film comprises at least one additive selected from a group consisting of conductive powder, at least one plasticizer, and reflective powder.

35. An all-solid-state electrochromic display device as claimed in any one of claims 22 through 31, wherein said electrolyte layer is a dispersed film consisting essentially of macromolecules of at least one polymer material with at least one ionic material dispersed in said film.

36. An all-solid-state electrochromic display device as claimed in any one of claims 22 through 31, wherein said electrolyte layer is a polyelectrolyte film consisting essentially of a polymer ionic material.

37. An all-solid-state electrochromic display device as claimed in any one of claims 27 through 31, wherein said electrolyte layer consists essentially of at least one inorganic solid electrolyte material.

38. An all-solid-state electrochromic display device comprising a substantially transparent electrode, a counter electrode, and a polymer electrochromic film between said transparent and said counter electrodes, wherein said polymer electrochromic film consists essentially of a polymer ionic material comprising at least one ionic material, with at least one organic electrochromic material dispersed in said polymer electrochromic film.

39. An all-solid-state electrochromic display device as claimed in claim 38, said polymer electrochromic film having a first and a second surface, wherein said transparent and said counter electrodes are in direct contact with said first and said second surfaces, respectively.

40. An all-solid-state electrochromic display device as claimed in claim 38, further comprising a solid electrolyte layer between said polymer electrochromic film and said transparent electrode.

41. An all-solid-state electrochromic display device as claimed in claim 38, further comprising a solid electrolyte layer between said polymer electrochromic film and said counter electrode.

42. An all-solid-state electrochromic display device as claimed in claim 41, further comprising a redox layer between said electrolyte layer and said counter electrode.

43. An all-solid-state electrochromic display device as claimed in claim 42, wherein said redox layer consists essentially of a polymer redox film comprising at least one redox material.

44. An all-solid-state electrochromic display device as claimed in claim 43, wherein said polymer redox film consists essentially of macromolecules of at least one polymer material, said at least one redox material being dispersed in said polymer redox film.

45. An all-solid-state electrochromic display device as claimed in claim 43, wherein said polymer redox film consists essentially of a polymer redox material comprising said at least one redox material.

46. An all-solid-state electrochromic display device as claimed in claim 43, wherein said polymer redox film further comprises at least one ionic material.

47. An all-solid-state electrochromic display device as claimed in claim 46, wherein said polymer redox film consists essentially of macromolecules of at least one polymer material, said at least one redox material and said at least one ionic material being dispersed in said polymer redox film.

48. An all-solid-state electrochromic display device as claimed in claim 46, wherein said polymer redox film consists essentially of a polymer redox material comprising said at least one redox material, said at least one ionic material being dispersed in said polymer redox film.

49. An all-solid-state electrochromic display device as claimed in claim 46, wherein said polymer redox film consists essentially of a high polymer redox material and a polymer ionic material, said polymer redox material comprising said at least one redox material, said polymer ionic material comprising said at least one ionic material.

50. An all-solid-state electrochromic display device as claimed in any one of claims 43 through 49, wherein said polymer redox film is cross-linked.

51. An all-solid-state electrochromic display device as claimed in claim 50, wherein said cross-linked polymer redox film comprises at least one additive selected from a group consisting of conductive powder, at least one plasticizer, and reflective powder.

52. An all-solid-state electrochromic display device as claimed in any one of claims 43 through 49, wherein said polymer redox film comprises at least one additive selected from a group consisting of conductive powder, at least one plasticizer, and reflective powder.

53. An all-solid-state electrochromic display device as claimed in any one of claims 40 through 49, wherein said electrolyte layer is a dispersed film consisting essentially of macromolecules of at least one polymer material with at least one ionic material dispersed in said film.

54. An all-solid-state electrochromic display device as claimed in any one of claims 40 through 49, wherein said electrolyte layer is a polyelectrolyte film consisting essentially of a polymer ionic material.

55. An all-solid-state electrochromic display device as claimed in any one of claims 40 through 49, wherein said electrolyte layer consists essentially of at least one inorganic solid electrolyte material.

56. An all-solid-state electrochrmic display device comprising a substantially transparent electrode, a counter electrode, and a polymer electrochromic film between said transparent and said counter electrodes, wherein said polymer electrochromic film consists essentially of a polymer electrochromic material and a polymer ionic material, said polymer electrochromic material, said polymer ionic material comprising at least one ionic material.

57. An all-solid-state electrochromic display device as claimed in claim 56, said polymer electrochromic film having a first and a second surface, wherein said transparent and said counter electrodes are in direct contact with said first and said second surfaces, respectively.

58. An all-solid-state electrochromic display device as claimed in claim 56, further comprising a solid electrolyte layer between said polymer electrochromic film and said transparent electrode.

59. An all-solid-state electrochromic display device as claimed in claim 56, further comprising a solid electrolyte layer between said polymer electrochromic film and said counter electrode.

60. An all-solid-state electrochromic display device as claimed in claim 59, further comprising a redox layer between said electrolyte layer and said counter electrode.

61. An all-solid-state electrochromic display device as claimed in claim 60, wherein said redox layer consists essentially of a polymer redox film comprising at least one redox material.

62. An all-solid-state electrochromic display device as claimed in claim 61, wherein said polymer redox film consists essentially of macromolecules of at least one high polymer material, said at least one redox material being dispersed in said high polymer redox film.

63. An all-solid-state electrochromic display device as claimed in claim 61, wherein said polymer redox film consists essentially of a polymer redox material comprising said at least one redox material.

64. An all-solid-state electrochromic display device as claimed in claim 61, wherein said polymer redox film further comprises at least one ionic material.

65. An all-solid-state electrochromic display device as claimed in claim 64, wherein said polymer redox film consists essentially of macromolecules of at least one polymer material, said at least one redox material and said at least one ionic material being dispersed in said polymer redox film.

66. An all-solid-state electrochromic display device as claimed in claim 64, wherein said polymer redox film consists essentially of a polymer redox material comprising said at least one redox material, said at least one ionic material being dispersed in said polymer redox film.

67. An all-solid-state electrochromic display device as claimed in claim 64, wherein said polymer redox film consists essentially of a high polymer redox material and a polymer ionic material, said polymer redox material comprising said at least one redox material, said polymer ionic material comprising said at least one ionic material.

68. An all-solid-state electrochromic display device as claimed in any one of claims 61 through 67, wherein said polymer redox film is cross-linked.

69. An all-solid-state electrochromic display device as claimed in claim 68, wherein said cross-linked polymer redox film comprises at least one additive selected from a group consisting of conductive powder, at least one plasticizer, and reflective powder.

70. An all-solid-state electrochromic display device as claimed in any one of claims 61 through 67, wherein said polymer redox film comprises at least one additive selected from a group consisting of conductive powder, at least one plasticizer, and reflective powder.

71. An all-solid-state electrochromic display device as claimed in any one of claims 58 through 67, wherein said electrolyte layer is a dispersed film consisting essentially of macromolecules of at least one polymer material with at least one ionic material dispersed in said film.

72. An all-solid-state electrochromic display device as claimed in any one of claims 58 through 67, wherein said electrolyte layer is a polyelectrolyte film consisting essentially of a polymer ionic material.

73. An all-solid-state electrochromic display device as claimed in any one of claims 58 through 67, wherein said electolyte layer consists essentially of at least one inorganic solid electrolyte material.

74. An all-solid-state electrochromic display device as claimed in any one of claims 2 through 13, any one of claims 20 through 31, any one of claims 38 through 49, or any one of claims 56 through 67, wherein said polymer electrochromic film is a cross-linked polymer electrochromic film.

75. An all-solid-state electrochromic display device as claimed in claim 74, wherein said cross-linked polymer electrochromic film comprises at least one additive selected from a group consisting of conductive powder, at least one plasticizer, and reflective powder.

76. An all-solid-state electrochromic display device as claimed in any one of claims 2 through 13, any one of claims 20 through 31, any one of claims 38 through 49, or any one of claims 56 through 67, wherein said polymer electrochromic film comprises at least one additive selected from the group consisting of conductive powder, at least one plasticizer, and reflective powder.

* * * * *

UNITED STATES PATENT AND TRADEMARK OFFICE
CERTIFICATE OF CORRECTION

PATENT NO. : 4,550,982
DATED : November 5, 1985
INVENTOR(S) : Hirai

It is certified that error appears in the above-identified patent and that said Letters Patent is hereby corrected as shown below:

IN THE ABSTRACT:

Line 5, change "lest" to --least--.

IN THE SPECIFICATION:

Column 15, lines 22-23, change "meconds" to --seconds--.

Column 18, line 54, change "large-scale" to --large--.

IN THE CLAIMS:

Column 22, line 31, before "polymer" delete "high".

Column 23, line 29, before "polymer" delete "high".

line 30, before "polymer" delete "high".

Column 24, line 1, before "polymer" delete "high".

Signed and Sealed this

Twenty-fourth Day of June 1986

[SEAL]

Attest:

DONALD J. QUIGG

Attesting Officer

Commissioner of Patents and Trademarks